US010713110B2

United States Patent
Antonio et al.

(10) Patent No.: US 10,713,110 B2
(45) Date of Patent: Jul. 14, 2020

(54) AUTOMATED ISSUE DETECTION AND RESOLUTION FRAMEWORK FOR ENTERPRISE RESOURCE PLANNING

(71) Applicant: Accenture Global Solutions Limited, Dublin (IE)

(72) Inventors: Emmanuel Benbinuto Antonio, Mandaluyong (PH); Darwin Endaya Flores, Pampanga (PH); Joseph Christian Policarpio Tamayo, Pasig (TW); John Carlo Canlubo De Guzman, Laguna (PH); Raye Willson Paez Raymundo, Cavite (PH)

(73) Assignee: Accenture Global Solutions Limited, Dublin (IE)

( * ) Notice: Subject to any disclaimer, the term of this patent is extended or adjusted under 35 U.S.C. 154(b) by 148 days.

(21) Appl. No.: 15/937,193

(22) Filed: Mar. 27, 2018

(65) Prior Publication Data

US 2019/0303232 A1    Oct. 3, 2019

(51) Int. Cl.
*G06F 11/07* (2006.01)
*G06F 11/34* (2006.01)
(Continued)

(52) U.S. Cl.
CPC ...... *G06F 11/0793* (2013.01); *G06F 11/0706* (2013.01); *G06F 11/0751* (2013.01);
(Continued)

(58) Field of Classification Search
CPC ............... G06F 11/0793; G06F 11/079; G06F 11/3003; G06F 11/0751; G06F 11/3495;
(Continued)

(56) References Cited

U.S. PATENT DOCUMENTS 7,861,252 B2    12/2010  Uszok et al.
8,019,881 B2*    9/2011  Sandhu ............... G06F 21/6263
                                                                 709/203
(Continued)

FOREIGN PATENT DOCUMENTS

JP    2010072725 A    4/2010
JP    2010198054 A    9/2010

OTHER PUBLICATIONS

Urli S., et al.,"How to Design a Program Repair Bot? Insights from the Repairnator Project" HAL 8, Feb. 2018, Retrieved from the Internet [URL: https://hal.inria.fr/hal-01691496v3/document>].

*Primary Examiner* — Matthew M Kim
*Assistant Examiner* — Kurosu Risa Altaf
(74) *Attorney, Agent, or Firm* — Harrity & Harrity, LLP

(57) ABSTRACT

In some possible implementations, an operations platform may include one or more memories; and one or more processors, communicatively coupled to the one or more memories, to: monitor a client platform without interacting with a user interface of the client platform; detect an issue associated with the client platform based on monitoring the client platform; determine whether the operations platform has access to a bot to resolve the issue; generate the bot when the operations platform does not have access to the bot; and deploy the bot with regard to the client platform to resolve the issue, wherein the bot is configured to resolve the issue without interacting with the user interface of the client platform.

20 Claims, 9 Drawing Sheets

(51) Int. Cl.
*H04L 9/32* (2006.01)
*G06Q 10/06* (2012.01)
*G06F 11/30* (2006.01)
*G06F 8/60* (2018.01)

(52) U.S. Cl.
CPC ........ *G06F 11/302* (2013.01); *G06F 11/3003* (2013.01); *G06F 11/3495* (2013.01); *G06Q 10/0631* (2013.01); *H04L 9/3226* (2013.01); *G06F 8/60* (2013.01)

(58) Field of Classification Search
CPC ...... G06F 11/302; G06F 8/60; H04L 63/0823; H04L 9/3226; G06Q 10/0631
See application file for complete search history.

(56) References Cited

U.S. PATENT DOCUMENTS

| | | | |
|---|---|---|---|
| 9,294,456 B1* | 3/2016 | Timmermans | H04L 63/083 |
| 9,313,091 B1* | 4/2016 | Schnegelberger | H04L 41/16 |
| 2003/0149578 A1* | 8/2003 | Wong | G06Q 10/06312 |
| | | | 705/7.22 |
| 2004/0249914 A1* | 12/2004 | Flocken | G06F 11/0709 |
| | | | 709/223 |
| 2015/0319160 A1* | 11/2015 | Ferguson | H04L 9/0822 |
| | | | 726/10 |
| 2017/0034163 A1* | 2/2017 | Priyadarshini | H04L 63/0876 |
| 2017/0123889 A1* | 5/2017 | Haridas | G06F 16/10 |
| 2017/0279702 A1* | 9/2017 | Mah | H04L 43/12 |

* cited by examiner

AUTOMATED ISSUE DETECTION AND RESOLUTION FRAMEWORK FOR ENTERPRISE RESOURCE PLANNING

BACKGROUND

An entity may plan resource usage or allocation using a software platform. For example, the software platform may be referred to as an enterprise resource planning (ERP) platform. The ERP platform may provide various software interfaces and components to perform key functions of the entity. One ERP platform is the SAP ERP platform.

SUMMARY

In some possible implementations, an operations platform may include one or more memories; and one or more processors, communicatively coupled to the one or more memories, to: monitor a client platform without interacting with a user interface of the client platform; detect an issue associated with the client platform based on monitoring the client platform; determine whether the operations platform has access to a bot to resolve the issue; generate the bot when the operations platform does not have access to the bot; and deploy the bot with regard to the client platform to resolve the issue, wherein the bot is configured to resolve the issue without interacting with the user interface of the client platform.

In some possible implementations, a method may include monitoring, by an operations platform, a client platform based on a monitor instruction; detecting, by the operations platform, an issue associated with the client platform based on monitoring the client platform; determining, by the operations platform, whether the operations platform has access to a bot to resolve the issue; generating, by the operations platform, the bot when the operations platform does not have access to the bot; and deploying, by the operations platform, the bot with regard to the client platform to resolve the issue, wherein the bot is configured to resolve the issue without interacting with a user interface of the client platform.

In some possible implementations, a non-transitory computer-readable medium may store one or more instructions that, when executed by one or more processors of an operations platform, cause the one or more processors to: identify an issue associated with a client platform that can be resolved using a bot, wherein the identification of the issue is based on one of: information obtained by monitoring the client platform, or receiving an instruction to execute the bot to resolve the issue; determine whether the bot is accessible or locally stored to resolve the issue; generate the bot when the bot is not accessible or locally stored; and execute the bot with regard to the client platform to resolve the issue, wherein the bot is configured to resolve the issue without interacting with a user interface of the client platform.

DETAILED DESCRIPTION

Figure 1A:
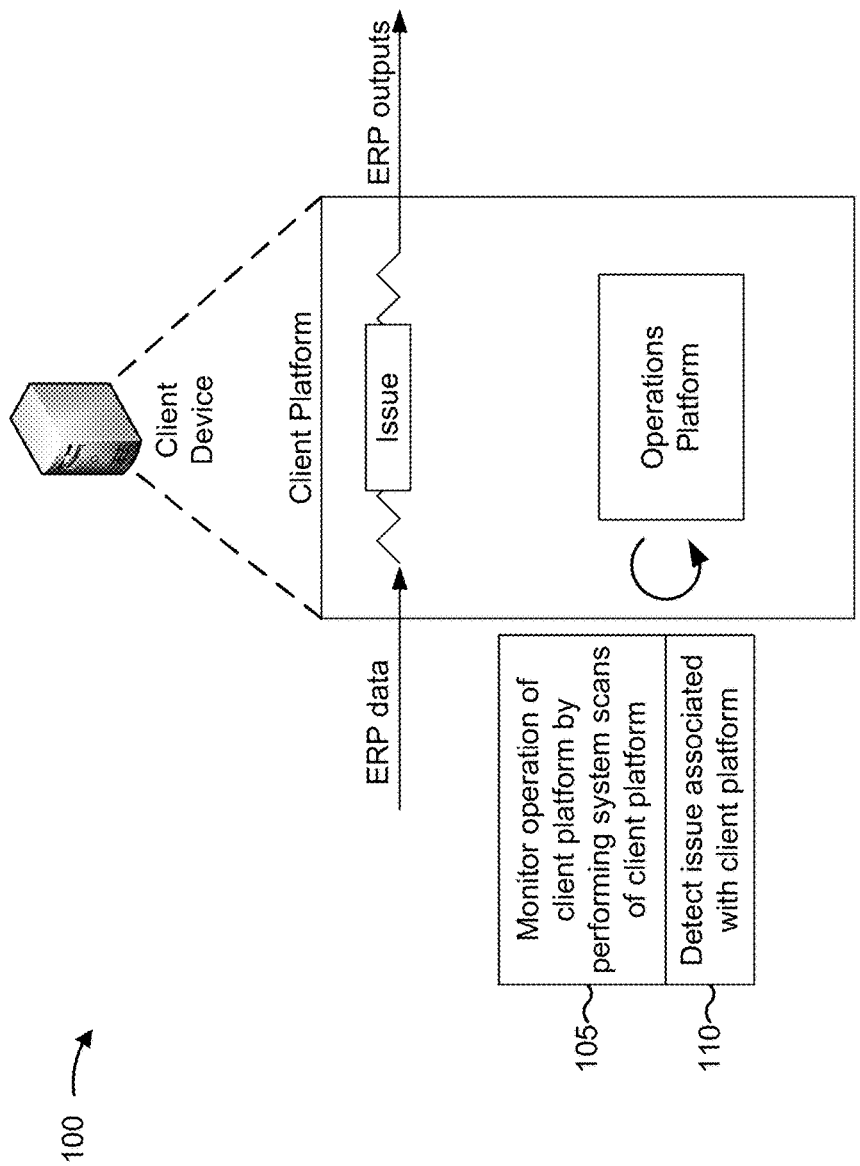
FIGS. 1A-1C are diagrams of an overview of an example implementation described herein.

The following detailed description of example implementations refers to the accompanying drawings. The same reference numbers in different drawings may identify the same or similar elements.

An entity may use an ERP platform to perform functions of the entity, such as operations, financials, human capital management, and corporate services. For example, the ERP platform may handle data collection, storage and management, associated with these different functions. ERP may provide an integrated and continuously updated view of core business processes using common databases maintained by a database management system. One ERP platform is SAP ERP.

An ERP platform may provide security, customizable user interfaces, and real-time (e.g., substantially real-time) access to data or functions for resource planning. However, the usage of software to provide security, customizable user interfaces, and real-time access to data may create the potential for errors or issues to arise. These issues can be associated with a user (e.g., a forgotten password, a misconfigured batch job, etc.) or with the system (e.g., a batch job failure, an intermediate document (IDOC) failure, etc.). Furthermore, some ERP platforms may not provide robust analytics functions, particularly when the ERP platform must interface with different technologies and databases. Finally, some user-originated issues (e.g., a forgotten password) may not be detectable within the ERP platform.

Some implementations described herein automatically detect issues within an ERP platform, such as SAP ERP. For example, some implementations described herein may automatically and proactively monitor the ERP platform to detect an issue, and may deploy a bot, within the ERP platform, to resolve the issue. This may be more efficient than a user-interface-based service for error detection and resolution, such as robotic process automation (RPA), since RPA requires interaction with a user interface which may change over time. Furthermore, some implementations described herein may monitor the ERP platform to collect monitoring data, and may perform analysis of the monitoring data or provide the monitoring data for analysis. This may provide analysis of data associated with an ERP platform, which may be difficult or impossible for some ERP platforms, such as a SAP ERP platform, to perform natively. Furthermore, some implementations described herein may provide an interface (e.g., a user interface, an application programming interface (API), etc.) for user interaction to trigger resolution of issues that are not detectable to the ERP platform (e.g., user-originated issues such as a lost password). Some implementations described herein may deploy bots reactively to resolve an issue (e.g., based on input to a user interface, based on an interaction with an external device, etc.).

In this way, implementations described herein may improve operation of an ERP platform while reducing manual input needed to identify and resolve issues with the ERP platform. Furthermore, implementations described herein may conserve processor resources and provide a more comprehensive view of states of the ERP platform in comparison to a less efficient approach, such as a RPA-based approach that interacts with a user interface of the ERP platform. Still further, implementations described herein may be more resilient to user interface changes than an RPA-based approach, which may require reconfiguration as user interfaces of the ERP platform change.

Figure 1B:
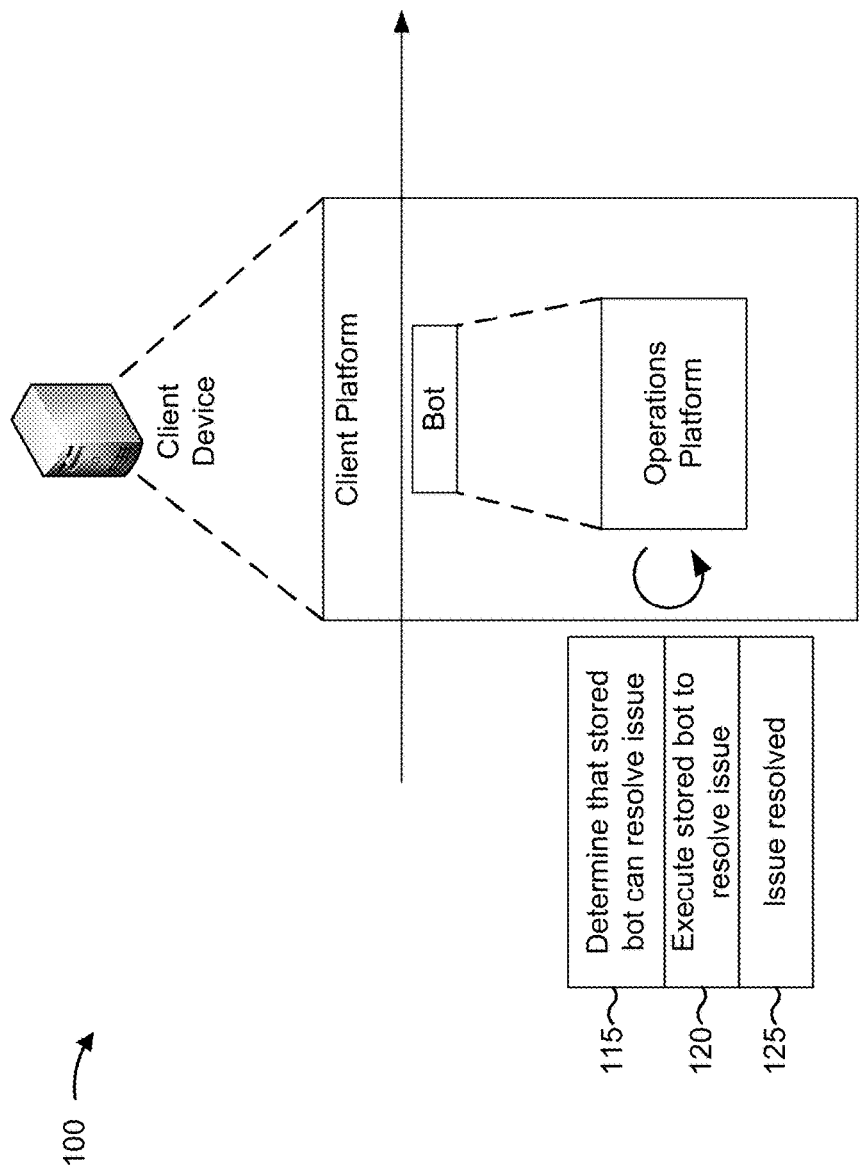
Figure 1C:
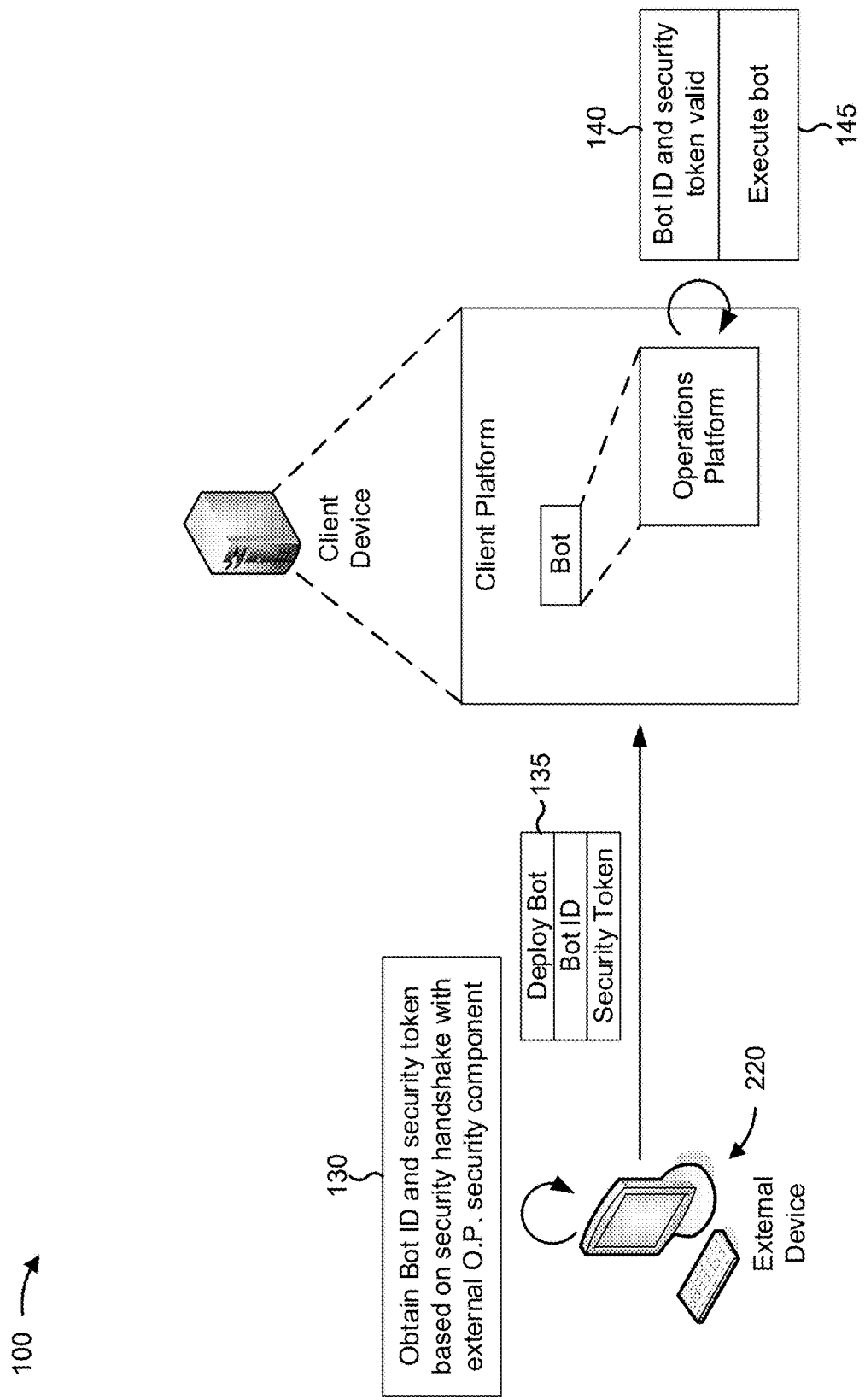

FIGS. 1A-1C are diagrams of an overview of an example implementation 100 described herein. As shown, example implementation 100 includes a client platform implemented on a client device (e.g., client device 210, described below). In some implementations, the client platform may be implemented in a cloud computing environment (e.g., cloud computing environment 240, described below). The client platform may include an ERP platform, such as a SAP ERP platform. As further shown, an operations platform (e.g., operations platform 230, described below) may be implemented on the client platform and/or the client device. In some implementations, the operations platform may be implemented in the cloud computing environment.

As shown, the client platform may receive ERP data and may output one or more ERP outputs based on the data. In reality, the operation of the ERP platform may be quite complex, and may include obtaining data from many different sources, processing or manipulating the data, and providing the data to different stakeholders or users. Here, the operation of the ERP platform is simplified for clarity when describing the implementations described herein.

As shown, the client platform may be associated with an issue. The issue may include a configuration error, an operation error, a communication error, or any other type of technical problem with operation of the client platform. In some cases, the issue may be a user-originated issue. The user-originated issue may be an issue that the operations platform cannot detect, such as a forgotten password, a misconfigured user interface, a misconfigured user permission, and/or the like. In some implementations, the operations platform may be capable of detecting some user-originated issues. In other words, the definition of user-originated issue is not limited to those that the operations platform cannot detect. Particular examples of issues include a batch job failure, an intermediate document failure, a process that has been running for a length of time that satisfies a threshold, and/or the like.

As shown by reference number 105, the operations platform may monitor operation of the client platform. The operations platform may monitor the operation of the client platform to identify issues associated with the client platform. For example, the operations platform may perform system scans of the client platform. In some implementations, the operations platform may monitor a database of the client platform to identify the issues, as described in more detail elsewhere herein. In some implementations, the monitoring may be performed by one or more detectors. A detector may include a program, component, module, bot, or script configured to monitor a particular aspect of the client platform. In some implementations, a detector may be configured automatically by the operations platform. In some implementations, a detector may be configured by a user (e.g., based on a message from an external device). In some implementations, a detector may be associated with a schedule, which may be configurable by the operations platform or a user associated with the external device.

As shown by reference number 110, the operations platform may detect an issue associated with the client platform based on monitoring the client platform. For example, the operations platform may detect the issue using one or more of the detectors described above. In some implementations, the operations platform may store or provide information identifying the issue. For example, the operations platform may provide a notification to an administrator when the operations platform detects the issue. As another example, the operations platform may provide a notification to a particular entity when the operations platform detects the issue. For example, the particular entity may be associated with a domain or subsystem of the client platform with which the issue is associated.

As shown in FIG. 1B, and by reference number 115, the operations platform may determine that a stored bot (e.g., stored by the operations platform and/or the client platform) can resolve the issue. For example, the operations platform may determine that the issue is associated with the stored bot based on an issue type of the issue. As another example, the operations platform may determine that the issue is associated with the stored bot based on the stored bot being associated with the detector that detected the issue. As a third example, the operations platform may determine that the issue is associated with the stored bot based on an action to be performed to resolve the issue (e.g., based on determining that the stored bot is configured to perform the action). Other examples are possible and contemplated herein.

As shown by reference number 120, the operations platform may execute the stored bot to resolve the issue. For example, a bot, as described herein, may be a program or script that is configured to perform an action to resolve a corresponding issue. In some implementations, such as when the client platform is a SAP ERP platform or system, the bot may be programmed or configured using Advanced Business Application Programming (ABAP) or a similar language. The operations platform may deploy or execute the stored bot to resolve the issue. In some implementations, the operations platform may gather information to deploy or execute the stored bot. For example, when the stored bot needs information to resolve the issue, the operations platform may request or obtain the information from a database of the client platform (e.g., database 430, described below) or from an external device (e.g., external device 220, described below). In this way, the operations platform may gather information needed to resolve the issue without human intervention, thereby increasing the volume of issues that can be simultaneously resolved, increasing the speed of resolution of an issue, and reducing human error associated with resolving issues, and conserving resources (e.g., processor, memory, network, and/or the like).

As shown by reference number 125, the operations platform may determine that the issue is resolved. For example, the operations platform may determine that the issue is no longer detected. Additionally, or alternatively, the operations platform may determine that the stored bot has returned a successful result. In some implementations, the operations platform may provide information indicating that the issue is resolved (e.g., to an administrator, to an entity associated with a subsystem associated with the issue, to an external device, etc.). In this way, the operations platform resolves the issue without human intervention and notifies appropriate parties. This may enable the maintenance of the client platform at a volume and efficiency that may not be achievable using human actors. Furthermore, implementations described herein may resolve the issue without user interface interaction, thereby conserving user interface resources.

FIG. 1C describes a reactive approach for deploying a bot, wherein a bot is deployed based on an instruction received from an external device, such as external device 220 described below. The reactive approach may be useful for user-triggered bot deployment, such as deployment of a bot to resolve a user-originating issue (e.g., a lost password, a user account deletion, etc.). As shown in FIG. 1C, and by reference number 130, the external device may obtain a bot identifier and a security token based on a security handshake. For example, the external device may include an external operations platform (OP) security component (e.g., external OP security component 510, described below), which may be paired with the operations platform. The external device may perform the security handshake with the external OP security component and/or the operations platform, as described in more detail in connection with FIG. 5, below. Notably, the security handshake may be performed in addition to traditional digital security techniques, thereby increasing security of the operations platform and reducing likelihood of malicious execution of a bot.

As shown by reference number 135, the external device may provide an instruction to deploy a bot. For example, the instruction may include the bot identifier. In some implementations, the bot identifier may be encrypted by the external device based on the security handshake, thereby further increasing security. As further shown, the instruction may include a security token, which may correspond to a pair of the operations platform and an external OP security component of the external device, thereby increasing security even further.

As shown by reference number 140, the operations platform may determine that the bot identifier and the security token are valid. In some implementations, the operations platform may determine that the instruction is properly formatted and/or contains the proper information. This process is described in more detail in connection with FIG. 7, below. As shown by reference number 145, the operations platform may execute the bot identified by the bot identifier. In some implementations, the operations platform may determine a result of executing the bot, and may provide information identifying a result of executing the bot. For example, the operations platform may provide the information identifying the result of executing the bot to the external device.

In this way, the external device can trigger execution of a bot after performance of a security handshake, which allows secure triggering of bot execution by the external device. In some implementations, communications of the external device and the operations platform may be based on a single API, thereby simplifying implementation of the communications and conserving overhead and processor resources that would otherwise be used to communicate via multiple APIs.

Notably, the bots (e.g., detector bots, execution bots, and/or monitoring bots) may perform the operations described herein without interaction with a user interface of the client platform. This may provide an advantage over RPA, which may be implemented through interaction with user interfaces of the client platform. For example, RPA solutions may be vulnerable to reconfiguration of user interfaces, which may occur with some frequency in ERP systems. Furthermore, RPA may be less efficient than the implementations described herein because RPA needs to interact with a user interface, which must be provided by the client platform, whereas the operations platform can execute a bot to resolve an issue without user interface interaction, thereby conserving resources of the client platform that would be used to provide a user interface as well as resources of the operations platform and/or the external device that would be used to interact with the user interface.

As indicated above, FIGS. 1A-1C are provided merely as an example. Other examples are possible and may differ from what was described with regard to FIGS. 1A-1C.

Figure 2:
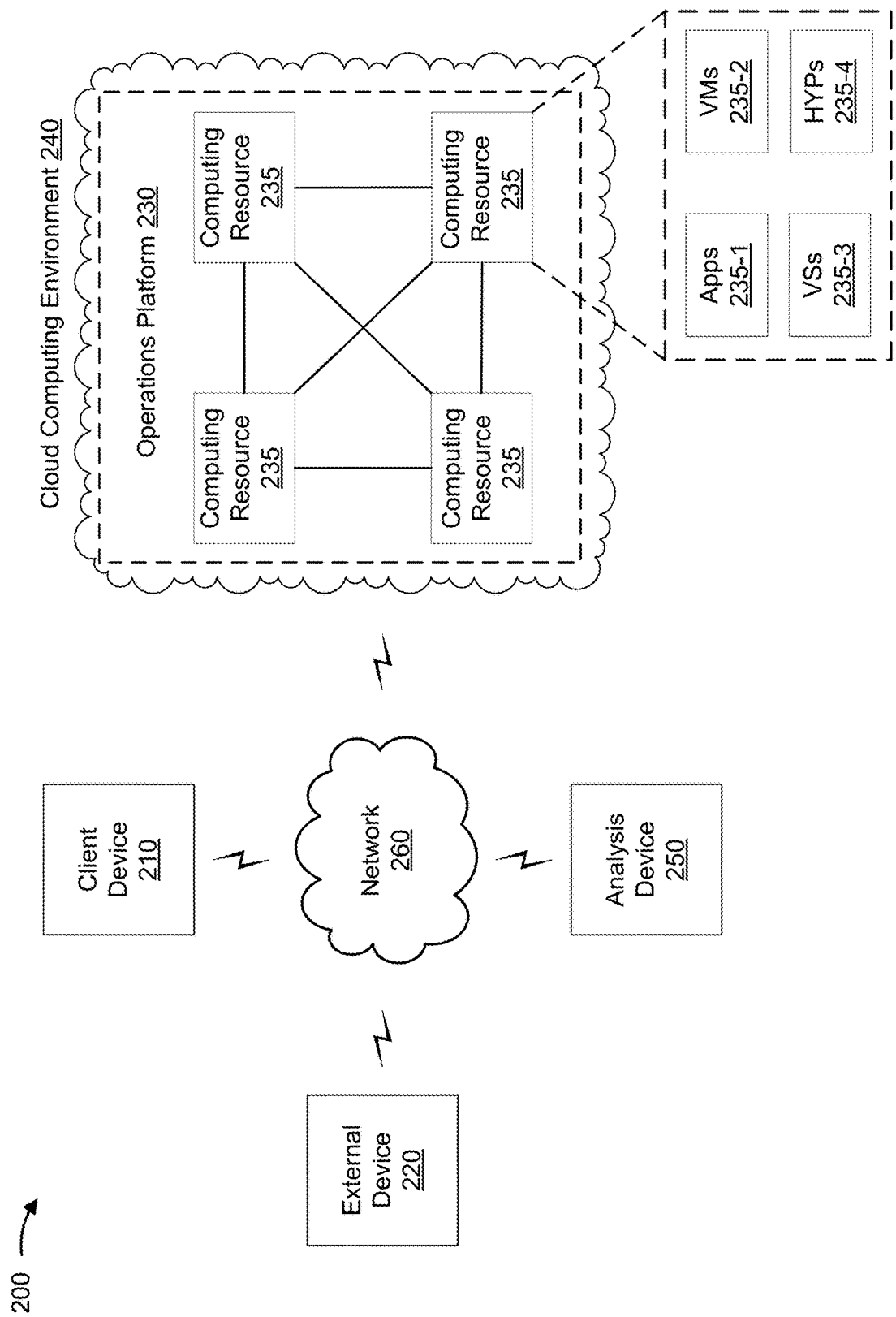
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include client device 210, external device 220, operations platform 230, and analysis device 250. Devices of environment 200 may interconnect via wired connections, wireless connections, or a combination of wired and wireless connections.

Client device 210 includes a device capable of hosting an ERP system or platform. For example, client device 210 may include a server or a group of servers. In some implementations, client device 210 may host a client platform, such as an ERP system or platform (e.g., a SAP ERP system or platform). In some implementations, client device 210 (or a client platform hosted by client device 210) may host operations platform 230. In some implementations, the client platform described above as being hosted by client device 210 may be implemented in cloud computing environment 240.

External device 220 includes a device capable of receiving, generating, storing, processing, or providing information associated with an instruction to execute a bot. For example, external device 220 may include a server or a group of servers. In some implementations, external device 220 may be implemented in a cloud computing environment 240.

Operations platform 230 includes a device capable of receiving, generating, storing, processing, and/or providing information associated with the configuration or execution of bots in an ERP system or platform. In some implementations, operations platform 230 may include one or more of the components described in FIG. 4, below. In some implementations, operations platform 230 may be implemented on client device 210. Additionally, or alternatively, operations platform 230 may be implemented in cloud computing environment 240.

Cloud computing environment 240 includes an environment that delivers computing as a service, whereby shared resources, services, etc. may be provided to client device 210, a client platform, external device 220, operations platform 230, and/or analysis device 250. Cloud computing environment 240 may provide computation, software, data access, storage, and/or other services that do not require end-user knowledge of a physical location and configuration of a system and/or a device that delivers the services. As shown, cloud computing environment 240 may include computing resources 235.

Computing resource 235 includes one or more personal computers, workstation computers, server devices, or another type of computation and/or communication device. In some implementations, computing resource 235 may host operations platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by client device 210. Application 235-1 may eliminate a need to install and execute the software applications on client device 210. For example, application 235-1 may include software associated with operations platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., client device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Analysis device 250 includes one or more devices capable of receiving, storing, generating, processing, analyzing, and/or providing information associated with analysis of data gathered by operations platform 230. For example, analysis device 250 may include a server, a group of servers, a user device (e.g., a laptop, a desktop computer, a smartphone, a tablet, etc.), and/or the like. In some implementations, analysis device 250 may be implemented in cloud computing environment 240.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
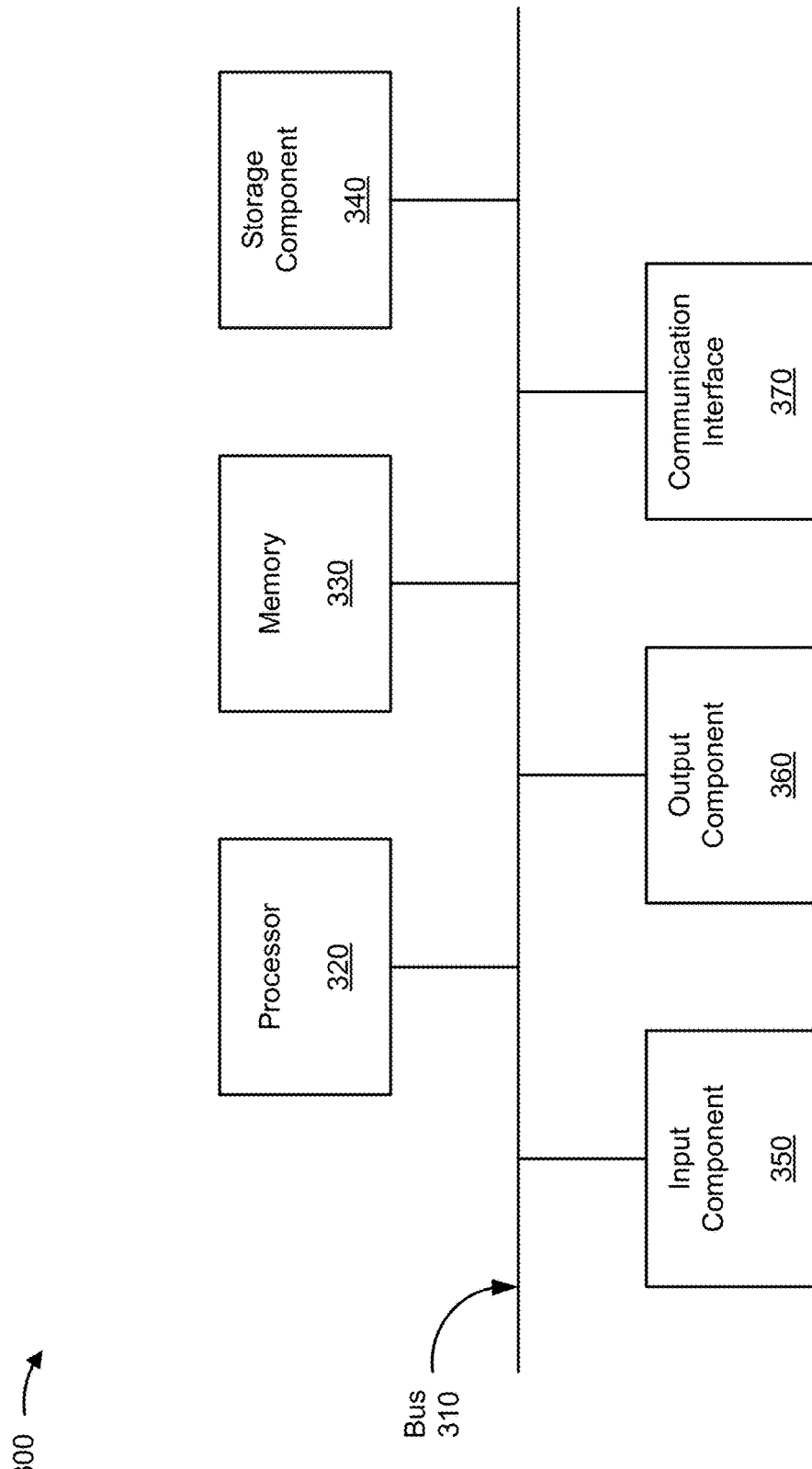
FIG. 3 is a diagram of example components of one or more devices of FIG. 2.

FIG. 3 is a diagram of example components of a device 300. Device 300 may correspond to client device 210, external device 220, and analysis device 250. In some implementations, client device 210, external device 220, and/or analysis device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes one or more memories such as a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
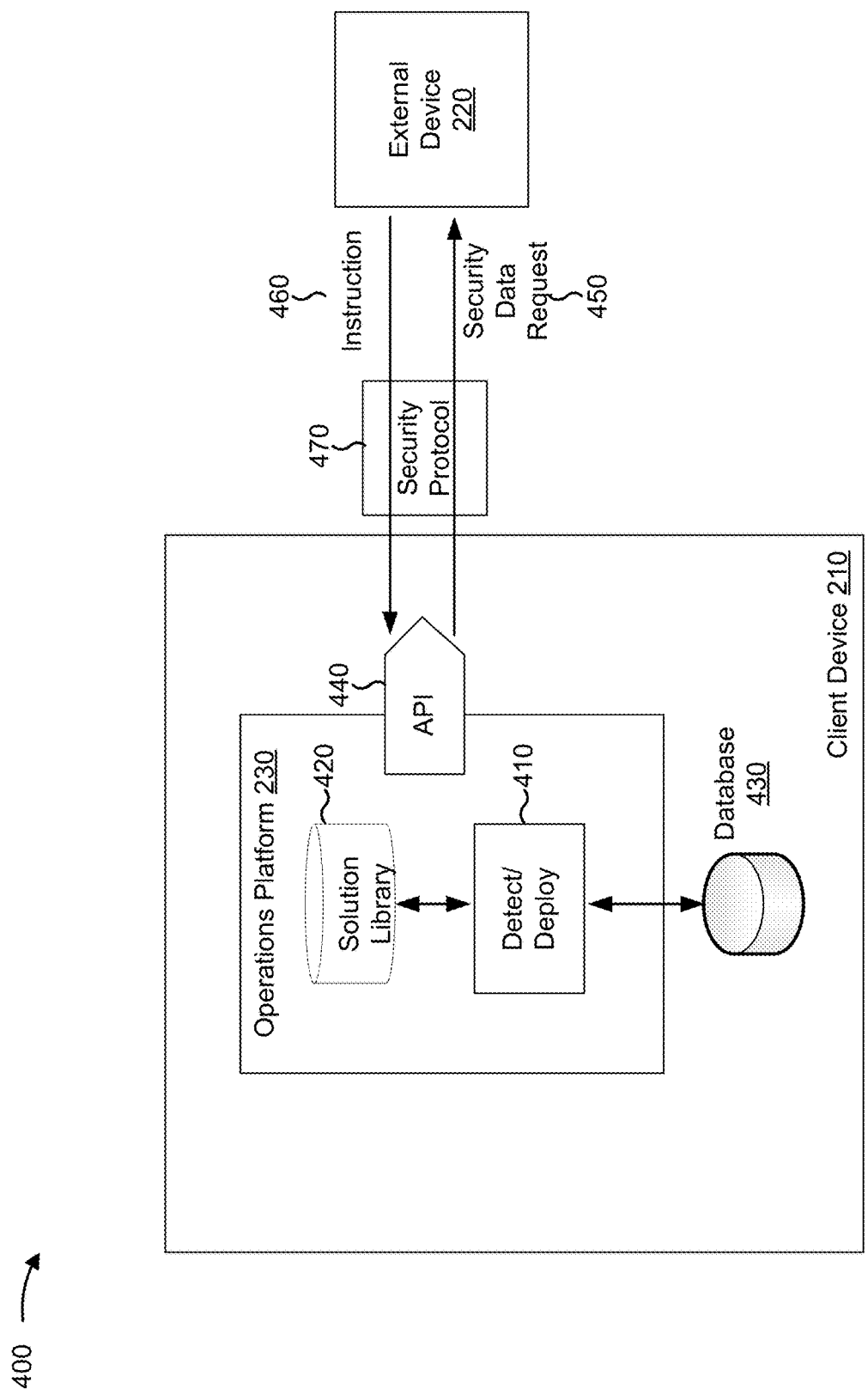
FIG. 4 is a diagram of an example implementation of an operations platform.

FIG. 4 is a diagram of an example implementation 400 of the operations platform 230 described herein. As shown, in some implementations, operations platform 230 may execute or operate on client device 210. This may conserve bandwidth, processor overhead, and other resources that would otherwise be used to facilitate communications between operations platform 230 and client device 210 when operations platform 230 is external to client device 210. In some implementations, operations platform 230 may execute on a different device or set of resources than client device 210. For example, operations platform 230 may be implemented as part of a cloud computing environment and/or the like. This may provide increased scalability and more flexible resource allocation for operations platform 230. In some implementations, client device 210 may implement or provide a client platform. For example, the client platform may include an ERP system, such as one implemented using SAP ERP.

As shown, operations platform 230 may include a detect/deploy component 410. Detect/deploy component 410 may detect issues associated with client device 210, and may deploy bots to resolve the detected issues. In some implementations, detect/deploy component 410 may generate a bot to resolve an issue. For example, detect/deploy component 410 may identify an action to be performed to resolve an issue, may generate a program (e.g., using ABAP or a similar language) to perform the action, and may generate the bot using the program. For example, the bot may include or be the program.

As further shown, operations platform 230 may include a solution library 420. Solution library 420 may store information for executing or deploying a bot, such as information identifying methods or sub-methods for performing actions to resolve an issue. In some implementations, solution library may store bots and/or information identifying bots. In some implementations, operations platform 230 may determine whether operations platform 230 has stored a bot or method for a particular issue by reference to solution library 420. In some implementations, when operations platform 230 generates a bot, operations platform 230 may store the bot using solution library 420.

As further shown, operations platform 230 may communicate with a database 430 of client device 210. Database 430 may include a system database of client device 210 (e.g., a system database of a SAP ERP platform) For example, detect/deploy component 410 may perform system scans of database 430 to identify an issue. Additionally, or alternatively, detect/deploy component 410 and/or a bot executed or deployed by detect/deploy component 410 may interact with database 430 to resolve an issue.

As further shown, operations platform 230 may be associated with an API 440. API 440 may provide for communication with external device 220. For example, operations platform 230 may provide support for external calls received from and/or provided to external device 220. In some implementations, API 440 may include a singular API that handles inbound and outbound communication, which reduces processor usage, complexity, and overhead associated with configuring two different APIs.

In some implementations, and as shown by reference number 450, operations platform 230 may provide a security data request to external device 220. For example, the security data request may be a request for security data, such as handshake information, information provided by an external security component hosted by external device 220, and/or the like. Assume that external device 220 and operations platform 230 successfully perform a handshake based on the security data request. In some implementations, and as shown by reference number 460, external device 220 may provide an instruction to operations platform 230. The instruction may include a bot identifier and/or security information, as described in more detail below. As further shown, operations platform 230 and external device 220 may communicate based on a security protocol 470, which is described in more detail in connection with FIG. 5, below.

As indicated above, FIG. 4 is provided as an example. Other examples are possible and may differ from what was described with regard to FIG. 4.

Figure 5:
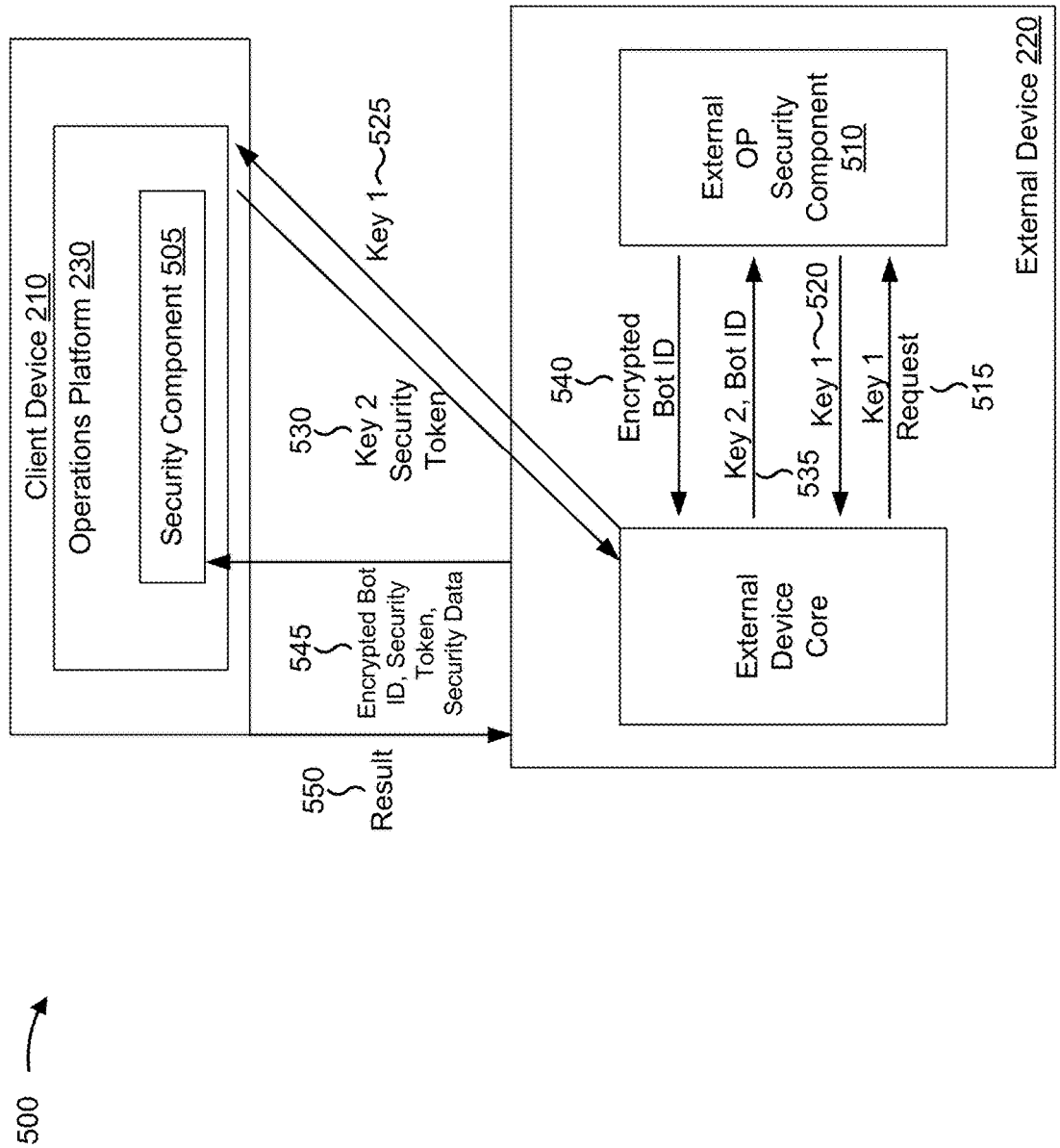
FIG. 5 is a diagram of an example security procedure for communication between an operations platform and an external device.

FIG. 5 is a diagram of an example security procedure 500 for communication between operations platform 230 and external device 220. As shown in FIG. 5, operations platform 230 may include a security component 505. Security component 505 may handle information associated with performing a handshake with external device 220, such as a security token, public keys, encryption information, and/or the like. As further shown, external device 220 may include an external operational platform (OP) security component 510. External OP security component 510 may handle information associated with performing a handshake with operations platform 230, such as security keys and/or the like. In some implementations, external OP security component 510 may perform encryption and/or the like for information such as a bot identifier. Furthermore, external device 220 is shown as including an external device core. The external device core may include any component of external device 220, and is shown to help illustrate interactions between external OP security component 510 and external device 220.

In some implementations, operations platform 230 may perform a security protocol to secure communication with external device 220. For example, the security protocol may include session encryption, virtual private network creation, and/or the like. Additionally, operations platform 230 may apply an additional layer of security based on a handshake with external device 220 to encrypt communications between operations platform 230 and external device 220. The security procedure 500, described below, may provide the additional layer of security.

As shown by reference number 515, external device 220 may request a first key (e.g., Key 1) from external OP security component 510. For example, the first key may be associated with operations platform 230, and may be used to signal, to operations platform 230, that external device 220 is trusted by external OP security component 510. As shown by reference number 520, external OP security component 510 may provide the first key to external device 220. As shown by reference number 525, external device 220 may provide the first key to operations platform 230. Operations platform 230 may determine whether the first key is valid (e.g., using a unique file that is provided for an operations platform-external device pair, such as a secure shell file) (not shown).

As shown by reference number 530, after verifying the first key (not shown), operations platform 230 may provide a security token and a second key (e.g., Key 2). For example, the second key may be a public key that external OP security component 510 can use to encrypt information for secure provision from external device 220 to operations platform 230.

As shown by reference number 535, external device 220 may provide the second key and a bot identifier (ID) to external OP security component 510. The bot identifier may identify a bot that operations platform 230 is to execute or deploy. This may provide external device 220 with the ability to trigger execution of bots by operations platform 230. Thus, operations platform 230 may execute a bot based on an instruction from external device 220, which allows for the execution of bots to remedy issues that operations platform 230 may not be capable of detecting (e.g., user-originated issues, such as forgotten passwords and/or the like). In some implementations, external OP security component 510 may encrypt the bot identifier using the second key (not shown). For example, the encryption algorithm may include Blowfish, Twofish, or any other reasonable encryption algorithm. By encrypting the bot identifier, security is improved and the likelihood of a malicious instruction being provided to operations platform 230 is reduced.

As shown by reference number 540, external OP security component 510 may provide the encrypted bot identifier to external device 220. As shown by reference number 545, external device 220 may provide the encrypted Bot identifier, the security token, and security data to operations platform 230. The security data may include any data required by operations platform 230 to verify the encrypted bot identifier and/or the security token, such as information identifying external device 220, information identifying external OP security component 510, and/or the like.

Operations platform 230 may decrypt the encrypted Bot identifier using the second key (e.g., a private key of the second key). In some implementations, operations platform 230 may determine that the security token provided by external device 220 matches the security token provided in connection with reference number 530. As shown by reference number 550, when operations platform 230 verifies the security token, operations platform 230 may execute the bot and may provide information identifying results of the execution to external device 220.

In this way, operations platform 230 and external OP security component 510 provide additional security in comparison to traditional security techniques (e.g., secure tunneling, encryption, etc.), which allows the execution of bots based on instructions received from external device 220. This, in turn, enables the execution of bots to resolve user-originated issues, which may not be detectable by operations platform 230.

As indicated above, FIG. 5 is provided merely as an example. Other examples are possible and may differ from what was described with regard to FIG. 5.

Figure 6:
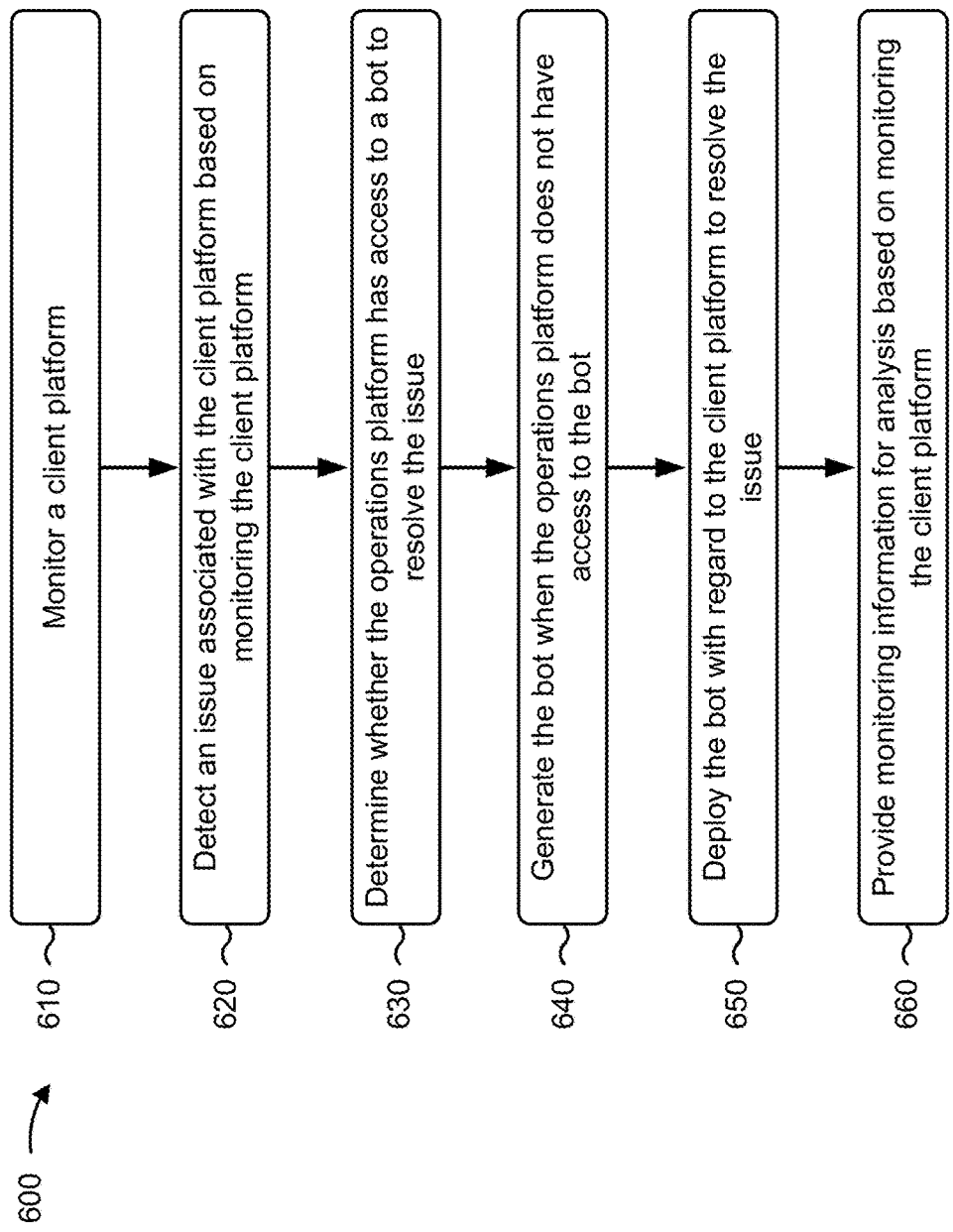
FIG. 6 is a flow chart of an example process for automatically detecting an issue and deploying a bot to resolve the issue.

FIG. 6 is a flow chart of an example process 600 for automatically detecting an issue and deploying a bot to resolve the issue. In some implementations, one or more process blocks of FIG. 6 may be performed by operations platform 230. In some implementations, one or more process blocks of FIG. 6 may be performed by another device or a group of devices separate from or including operations platform 230, such as client device 210, external device 220, analysis device 250, and/or the like.

As shown in FIG. 6, process 600 may include monitoring a client platform (block 610). For example, operations platform 230 (e.g., using computing resource 235 and/or processor 320) may monitor a client platform. The client platform may be implemented on client device 210 or cloud computing environment 240. In some implementations, the client platform may include a SAP ERP platform or system. Operations platform 230 may monitor the client platform to identify or detect issues that can be resolved using one or more bots, which may be stored by operations platform 230 or another device. In some implementations, the monitoring may be performed without interaction with a user interface of the client platform, thereby conserving resources that would otherwise be used to provide and/or interact with the user interface.

In some implementations, operations platform 230 may monitor the client platform using one or more detectors. In some implementations, a detector may include a bot. For example, a detector may include a program (e.g., using ABAP or a similar language) to determine whether a condition is met with regard to the client platform (e.g., a database of the client platform). In some implementations, a detector may be configured by a user. For example, the user may provide information identifying the condition and an execution bot to be executed when the condition is met. In this way, a user may configure the automatic monitoring of the client platform to detect issues, which may conserve processor resources associated with manual interaction to identify issues. Furthermore, the automatic detection of issues may enable the proactive resolution of such issues in comparison to providing an error notification to a user, thereby reducing impact on the client platform.

In some implementations, operations platform 230 may monitor the client platform to obtain information for analysis. For example, operations platform 230 may deploy a monitoring bot to obtain such information. The usage of the monitoring bots to gather information for analysis may conserve processor resources and user interface resources that would otherwise be used to manually gather such information, or to provide a user interface for external device 220 to gather such information. In some implementations, operations platform 230 may provide the information for analysis, as described in more detail in connection with block 660, below.

As further shown in FIG. 6, process 600 may include detecting an issue associated with the client platform based on monitoring the client platform (block 620). For example, operations platform 230 (e.g., using computing resource 235 and/or processor 320) may detect an issue (e.g., using a detector bot, as described in more detail elsewhere herein). In some implementations, operations platform 230 may detect the issue proactively (e.g., based on monitoring the client platform). In some implementations, operations platform 230 may receive an instruction associated with the issue. For example, the issue may be a user-originated issue, which operations platform 230 may not be capable of detecting directly. In such a case, the detection of the issue may be implicit (e.g., operations platform 230 may detect the issue based on receiving the instruction).

As further shown in FIG. 6, process 600 may include determining whether the operations platform has access to a bot to resolve the issue (block 630). For example, operations platform 230 (e.g., using computing resource 235 and/or processor 320) may determine whether operations platform 230 has access to a bot to resolve the issue. In some implementations, operations platform 230 may determine whether the bot is stored by operations platform 230. In some implementations, operations platform 230 may determine whether the bot is stored by a device associated with or accessible by operations platform 230 (e.g., client device 210, external device 220, etc.). In some implementations, operations platform 230 may determine whether a detector bot that detected the issue is associated with an execution bot to resolve the issue, and may determine whether the execution bot is stored by operations platform 230 or another device accessible to operations platform 230.

As further shown in FIG. 6, process 600 may include generating the bot when the operations platform does not have access to the bot (block 640). For example, in some cases, operations platform 230 may not have access to a bot (e.g., an execution bot) to resolve the issue. In such a case, operations platform 230 (e.g., using computing resource 235 and/or processor 320) may generate the bot. For example, operations platform 230 may store a solution library (e.g., solution library 420) that identifies sub-processes to resolve corresponding issues. Operations platform 230 may generate a bot (e.g., an ABAP program and/or the like) to resolve the issue according to a sub-process, identified by the solution library, to resolve the issue. In this way, operations platform 230 may automatically generate an execution bot based on the solution library when an appropriate execution bot is not available, thereby enabling the automatic resolution of issues. In some implementations, operations platform 230 may receive configuration information to configure or generate the execution bot (e.g., based on human input and/or the like).

In some implementations, a bot may be generated by combining two or more other bots. For example, operations platform 230 may determine that an issue is associated with a first bot and a second bot, and may combine the first bot and the second bot to generate a bot to resolve the issue. The combination of the first bot and the second bot may include a modification of the code of the first bot and/or the second bot. Additionally, or alternatively, operations platform 230 (or a user associated with operations platform 230) may identify two or more bots that are to be executed in a particular sequence. For example, operations platform 230 may use determine that a first bot is to be executed, followed by a second bot, and finally followed by a third bot to resolve the issue. Thus, the generated bot may include a combination of existing bots that are to be executed in a particular sequence. As another example, operations platform 230 (or a user associated with operations platform 230) may add a function to an existing bot to resolve an issue. For example, operations platform 230 may use the solution library to identify the function, and may add code (e.g., ABAP code and/or the like) to the existing bot to implement the function.

In some implementations, if the generated bot resolves the issue, then operations platform 230 may store the bot location of the generated bot along with information identifying the type of issue that was resolved. In this way, operations platform 230 expands the repository of bots and expands the number of issues that can be resolved by existing bots.

As further shown in FIG. 6, process 600 may include deploying the bot with regard to the client platform to resolve the issue (block 650). For example, operations platform 230 (e.g., using computing resource 235 and/or processor 320) may deploy (e.g., execute) the bot. In some implementations, operations platform 230 may deploy the bot based on particular information, such as information received from external device 220. For example, operations platform 230 may deploy the bot based on configuration information, particular parameters, and/or the like, which operations platform 230 may receive or request from external device 220. In some implementations, the bot may resolve the issue without interacting with a user interface of the client platform. For example, the bot may resolve the issue based on reading from and/or writing to a database associated with the client platform (e.g., database 430 and/or the like), thereby conserving resources that would be used to provide and/or interact with the user interface.

As further shown in FIG. 6, process 600 may include providing monitoring information for analysis based on monitoring the client platform (block 660). For example, in some implementations, operations platform 230 (e.g., using computing resource 235 and/or processor 320) may monitor the client platform to obtain information for analysis. In some implementations, operations platform 230 may monitor the client platform using one or more monitoring bots, as described in more detail elsewhere herein. By using the one or more monitoring bots, operations platform 230 may improve efficiency of collecting information for analysis. For example, some techniques for collecting such information may be implemented using user interfaces, which may use processor resources for implementing and/or interacting with the user interfaces. As another example, the information for analysis may be associated with different programs, sub-systems, and/or the like. In that case, it may be inefficient to use different programs and/or user interfaces to collect the information for analysis. By using a single operations platform 230 with a single API for implementing monitoring bots and collecting the information for analysis, operations platform 230 conserves processor resources, reduces errors in information gathering, and increases a volume of information that can be gathered.

In some implementations, operations platform 230 may provide the information for analysis. For example, operations platform 230 may provide the information for analysis by analysis device 250. In some implementations, operations platform 230 may analyze the information for analysis. In some implementations, the analysis may include any processing or analysis to be performed on ERP data. For example, the analysis may include financial analysis, operational analysis, and/or the like. In some implementations, operations platform 230 or analysis device 250 may perform the analysis based on a user configuration. For example, operations platform 230 or analysis device 250 may receive an input (e.g., a user input) identifying the user configuration, and may perform analysis based on the user configuration. The user configuration may identify information to be monitored for analysis, particular operations to be performed for analysis, reports to be generated for analysis, and/or the like. In some implementations, operations platform 230 may provide the information for analysis using the single API, which conserves processing resources and/or monitoring resources that would be used to implement multiple, different APIs.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
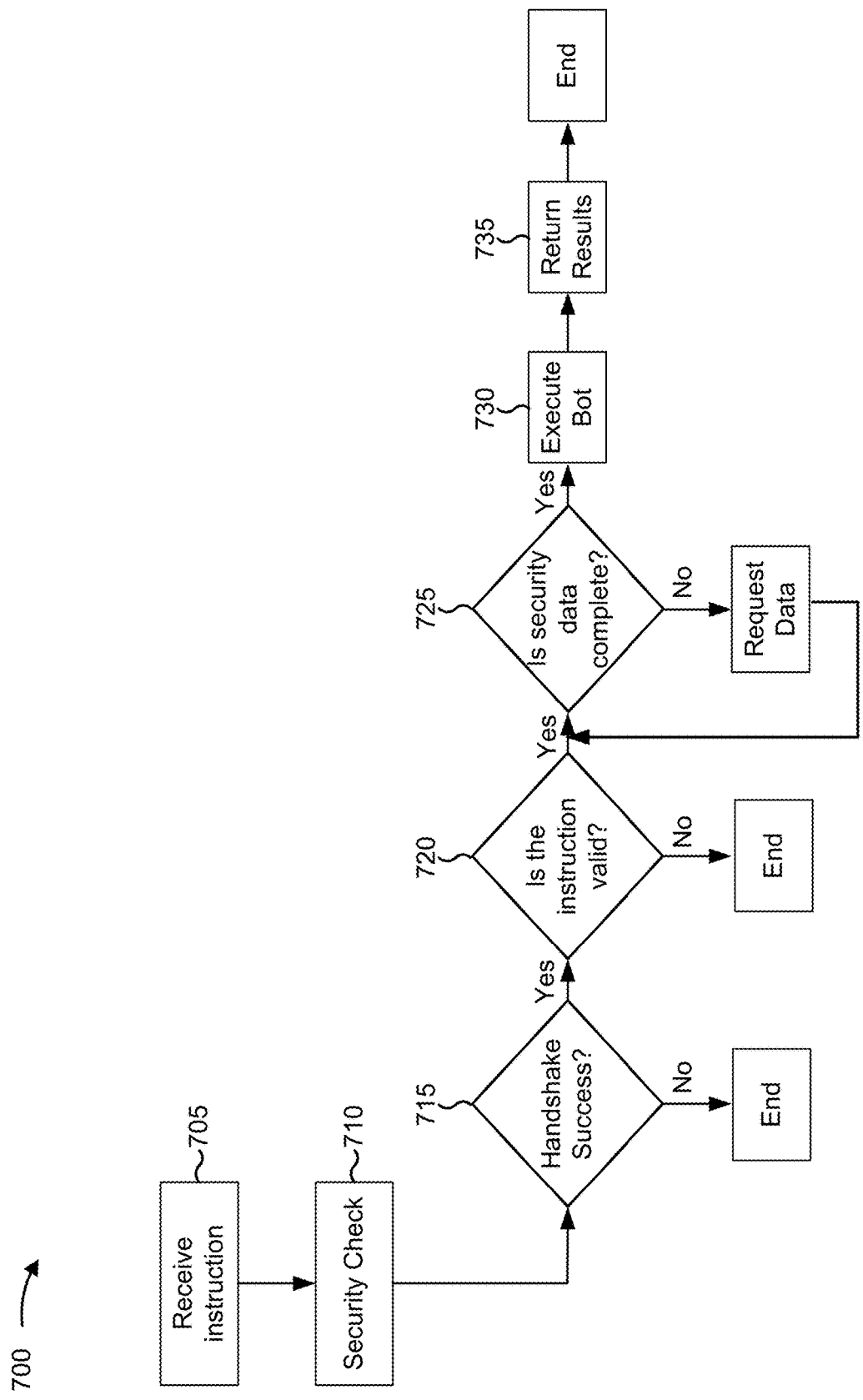
FIG. 7 is a flow chart of an example process for executing a bot based on an instruction received from an external device.

FIG. 7 is a diagram of an example process 700 for executing a bot based on an instruction received from an external device. In some implementations, one or more process blocks of FIG. 7 may be performed by operations platform 230. In some implementations, one or more process blocks of FIG. 7 may be performed by another device or a group of devices separate from or including operations platform 230, such as client device 210, external device 220, analysis device 250, and/or the like.

As shown in FIG. 7, process 700 may include receiving an instruction (block 705). For example, operations platform 230 may receive an instruction from external device 220. The instruction may include a bot identifier, a security token, and/or security data. External device 220 may provide the instruction to cause operations platform 230 to execute a bot identified by the bot identifier. In some implementations, the bot identifier may be encrypted. For example, an external OP security component 510 associated with external device 220 may encrypt the bot identifier using a public key associated with operations platform 230 (e.g., the second key described in connection with FIG. 5).

As further shown in FIG. 7, process 700 may include performing a security check with external device 220 (block 710). The security check may correspond to the process described in connection with FIG. 5, above. For example, the security check may include the handshake process described in connection with FIG. 5.

As further shown in FIG. 7, process 700 may include determining whether the handshake (e.g., the security check) is successful (block 715). In some cases, the handshake may not be successful (e.g., based on the first key being invalid, based on external device 220 providing an invalid security token, etc.). In such a case, operations platform 230 may not execute the bot indicated by the instruction, and may end process 700 (block 715—No).

As further shown in FIG. 7, when the handshake is successful (e.g., when the security check is successful) (block 715—Yes), then process 700 may include determining whether the instruction is valid (block 720). For example, operations platform 230 may determine whether the instruction matches a format defined in solution library 420 and/or includes information specified by solution library 420. In this way, operations platform 230 may reduce the likelihood of success of malicious instructions. In some cases, the instruction may not be valid (e.g., may not match the format or include the information specified by solution library 420). In such a case, operations platform 230 may not execute the bot indicated by the instruction, and may end process 700 (block 720—No).

As further shown in FIG. 7, operations platform 230 may determine whether the security data of the instruction is complete (block 725). For example, operations platform 230 may determine whether the instruction includes all security data required for execution of the bot. In some implementations, operations platform 230 may determine whether the instruction includes all data required to execute the bot. For example, the bot may require particular parameters, configuration information, and/or the like, which may be indicated by solution library 420. Operations platform 230 may determine whether the instructions specifies all of the particular parameters, configuration information, and/or the like. When the data is not complete (block 725—No), operations platform 230 may request the data from operations platform 230 until the data is complete.

As further shown in FIG. 7, when the security data (or other data) is complete (block 725—Yes), then process 700 may include executing the bot (block 730). For example, operations platform 230 may execute the bot when the handshake (e.g., security check) is complete, the instruction is valid, and the data is complete. As further shown, process 700 may include returning results (block 735). For example, operations platform 230 may determine results of executing the bot, and may provide the results to external device 220 or another device. In this way, operations platform 230 may securely execute a bot based on an instruction from external device 220, thereby enabling external control of operations platform 230 (e.g., to resolve user-originated issues). Furthermore, this may provide for efficient remote resolution of issues using a single API, which conserves processor resources, improves efficiency, and reduces technical knowledge requirements in comparison to attempting to resolve an issue using many different APIs, user interfaces, and/or the like.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In this way, operation of an SAP ERP system is improved and a volume of issues that can be simultaneously resolved is increased. This may increase the speed of resolution of issues and reduce human error involved with resolving issues. Furthermore, the bots described herein (e.g., detector bots, execution bots, and/or monitoring bots) may perform the operations described herein without interaction with a user interface of the client platform. This may provide an advantage over RPA, which may be implemented through interaction with user interfaces of the client platform. For example, RPA solutions may be vulnerable to reconfiguration of user interfaces, which may occur with some frequency in ERP systems. Furthermore, RPA may be less efficient than the implementations described herein because RPA needs to interact with a user interface, which must be provided by the client platform, whereas the operations platform 230 can execute a bot to resolve an issue without user interface interaction, thereby conserving resources of the client platform that would be used to provide a user interface as well as resources of the operations.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An operations platform, comprising:
   one or more memories; and
   one or more processors, communicatively coupled to the one or more memories, to:
   monitor a client platform without interacting with a user interface of the client platform;
   detect an issue associated with the client platform based on monitoring the client platform;
   determine that the operations platform does not have access to a bot to resolve the issue;
   identify, based on determining that the operations platform does not have access to the bot to resolve the issue, first bot and a second bot that correspond to the issue;
   generate the bot by combining the first bot and the second bot,
      wherein the one or more processors, when generating the bot, are to:
         generate the bot by modifying code of at least one of the first bot or the second bot; and
   deploy the bot with regard to the client platform to resolve the issue,
      wherein the bot is configured to resolve the issue without interacting with the user interface of the client platform.

2. The operations platform of claim 1, wherein the client platform is associated with an enterprise resource planning system.

3. The operations platform of claim 1, wherein the bot is an initial bot and the issue is a first issue; and
   wherein the one or more processors are further to:
      receive an instruction to deploy a subsequent bot associated with a second issue; and
      deploy the subsequent bot to resolve the second issue.

4. The operations platform of claim 3, wherein the one or more processors are further to:
   receive security information in association with the instruction,
      the security information including an encrypted bot identifier for the subsequent bot; and
   wherein the one or more processors, when deploying the subsequent bot, are to:
      deploy the subsequent bot based on the security information.

5. The operations platform of claim 3, wherein the one or more processors are further to:
   perform a handshake before receiving the instruction; and
   wherein the one or more processors, when deploying the subsequent bot, are to:
      deploy the subsequent bot based on a result of the handshake.

6. The operations platform of claim 3, wherein the second issue is a user-originated issue.

7. The operations platform of claim 6, wherein the subsequent bot is configured to resolve the issue without interacting with the user interface of the client platform.

8. A method, comprising:
   monitoring, by an operations platform, a client platform based on a monitor instruction;
   detecting, by the operations platform, an issue associated with the client platform based on monitoring the client platform;
   determining, by the operations platform, that the operations platform does not have access to a bot to resolve the issue;
   identifying, by the operations platform and based on determining that the operations platform does not have access to the bot to resolve the issue, a first bot and a second bot that correspond to the issue,
   generating, by the operations platform, the bot by combining the first bot and the second bot,
      wherein generating the bot comprises modifying code of at least one of the first bot or the second bot; and
   deploying, by the operations platform, the bot with regard to the client platform to resolve the issue,
      wherein the bot is configured to resolve the issue without interacting with a user interface of the client platform.

9. The method of claim 8, further comprising:
   providing, for analysis, information that is gathered based on monitoring the client platform.

10. The method of claim 8, further comprising:
    performing analysis with regard to information that is gathered based on monitoring the client platform.

11. The method of claim 8, further comprising:
receiving an instruction to deploy the bot,
wherein the instruction is received from an external device that is external to the client platform.

12. The method of claim 11, wherein the external device is associated with a component associated with the operations platform, and wherein the instruction is provided with security information that is generated by the component.

13. The method of claim 8, wherein the client platform is monitored without interaction with the user interface of the client platform.

14. The method of claim 8, wherein the bot is initial bot, and wherein the method further comprises:
receiving an instruction to deploy a subsequent bot for resolving a user-originated issue,
wherein the instruction is received via an application programming interface of the operations platform; and
deploying the subsequent bot to resolve the user-originated issue.

15. The method of claim 14, wherein the user-originated issue cannot be detected by monitoring the client platform.

16. A non-transitory computer-readable medium storing instructions, the instructions comprising:
one or more instructions that, when executed by one or more processors of an operations platform, cause the one or more processors to:
identify an issue associated with a client platform that is capable of being resolved using a bot,
wherein the identification of the issue is based on one of:
information obtained by monitoring the client platform, or
receiving an instruction to execute the bot to resolve the issue;
determine that the bot is not accessible or not locally stored;
identify, based on determining that the bot is not accessible or not locally stored, a first bot and a second bot that correspond to the issue,
generate the bot by combining the first bot and the second bot,
wherein the one or more instructions, that cause the one or more processors to generate the bot, cause the one or more processors to:
generate the bot by modifying code of at least one of the first bot or the second bot; and
execute the bot with regard to the client platform to resolve the issue,
wherein the bot is configured to resolve the issue without interacting with a user interface of the client platform.

17. The non-transitory computer-readable medium of claim 16, wherein the client platform comprises an enterprise resource planning platform.

18. The non-transitory computer-readable medium of claim 16, where the one or more instructions, when executed by the one or more processors, further cause the one or more processors to:
provide, for analysis, the information obtained by monitoring the client platform.

19. The non-transitory computer-readable medium of claim 16, wherein the one or more instructions, when executed by the one or more processors, cause the one or more processors to:
receive the instruction in association with security information,
the security information being received from an external device that is external to the client platform, and
the security information being generated or provided by a component, associated with the operations platform, that operates on the external device.

20. The non-transitory computer-readable medium of claim 19, wherein the instruction identifies the first bot and the second bot and wherein the security information includes a token that corresponds to the operations platform and the component.

* * * * *

UNITED STATES PATENT AND TRADEMARK OFFICE
CERTIFICATE OF CORRECTION

PATENT NO. : 10,713,110 B2
APPLICATION NO. : 15/937193
DATED : July 14, 2020
INVENTOR(S) : Emmanuel Benbinuto Antonio et al.

It is certified that error appears in the above-identified patent and that said Letters Patent is hereby corrected as shown below:

In the Claims

In Claim 14, Column 19, Line 12, "wherein the bot is initial bot," should be changed to --wherein the bot is an initial bot,--.

Signed and Sealed this
Twenty-seventh Day of October, 2020

Andrei Iancu
*Director of the United States Patent and Trademark Office*